United States Patent
Dalal et al.

(10) Patent No.: US 10,545,682 B1
(45) Date of Patent: Jan. 28, 2020

(54) SYSTEM AND METHOD HAVING ACCELERATED DATA RECOVERY

(71) Applicant: Veritas Technologies LLC, Mountain View, CA (US)

(72) Inventors: Chirag Dalal, Pune (IN); Sudhakar Paulzagade, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 36 days.

(21) Appl. No.: 15/055,090

(22) Filed: Feb. 26, 2016

(51) Int. Cl.
*G06F 3/06* (2006.01)

(52) U.S. Cl.
CPC .......... *G06F 3/0619* (2013.01); *G06F 3/0638* (2013.01); *G06F 3/0673* (2013.01)

(58) Field of Classification Search
CPC ......... G06F 611/1446; G06F 611/1448; G06F 3/0619; G06F 3/0644; G06F 2221/0782; G06F 17/30076; G06F 611/1451; G06F 611/1458; G06F 611/1469; G06F 611/1464; G06F 611/0209; G06F 611/1402
See application file for complete search history.

(56) References Cited

U.S. PATENT DOCUMENTS

| | | | | | |
|---|---|---|---|---|---|
| 5,673,381 | A * | 9/1997 | Huai | .................... | G06F 11/1464 711/162 |
| 7,024,527 | B1 * | 4/2006 | Ohr | ..................... | G06F 11/1464 100/154 |
| 7,809,692 | B1 * | 10/2010 | Pruthi | ................. | G06F 11/1448 707/674 |
| 8,849,878 | B1 * | 9/2014 | Bachu | ..................... | G06F 17/30 707/823 |
| 9,021,296 | B1 * | 4/2015 | Kiselev | ............... | G06F 11/2082 714/6.23 |
| 2012/0084523 | A1 * | 4/2012 | Littlefield | ........... | G06F 11/1469 711/162 |
| 2012/0233417 | A1 * | 9/2012 | Kalach | ................ | G06F 11/1469 711/162 |
| 2015/0269022 | A1 * | 9/2015 | Taranta, II | .......... | G06F 11/1092 714/766 |

OTHER PUBLICATIONS

Chervenak, Ann, Vivekenand Vellanki, and Zachary Kurmas. "Protecting file systems: A survey of backup techniques." Joint NASA and IEEE Mass Storage Conference. vol. 99. 1998.*

* cited by examiner

*Primary Examiner* — Tracy A Warren
(74) *Attorney, Agent, or Firm* — Patent Law Works LLP

(57) ABSTRACT

A system and method having accelerated data recovery in a clustered storage system is provided. The method may include generating an extent map of data having an original order, wherein the extent map associates the original order with a stored order of the data in a plurality of storage units coupled to a server node. After receipt of a request for data recovery of a subset of data, the method may further include optimizing data retrieval of the data to a minimum recovery time using the extent map. For static optimization, the server node can generate a second map indicating the stored order of each fragment of data to be sent prior to the data. Alternatively in dynamic optimization, the server node can send a qualifying identifier with each fragment indicating the storage location. Thereby, the client node is enabled to rearrange the data upon receipt to its original order.

17 Claims, 6 Drawing Sheets

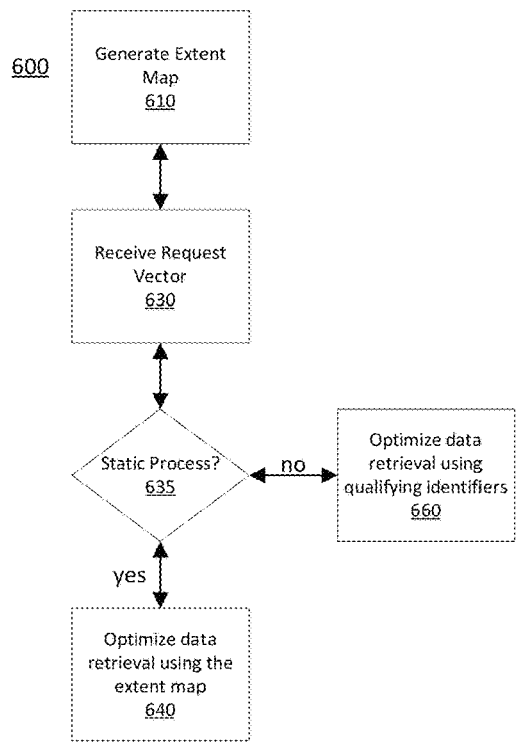
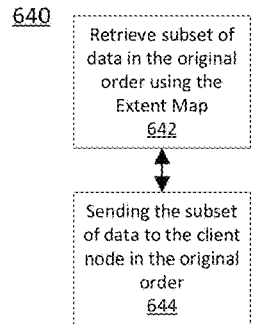
FIG. 6A
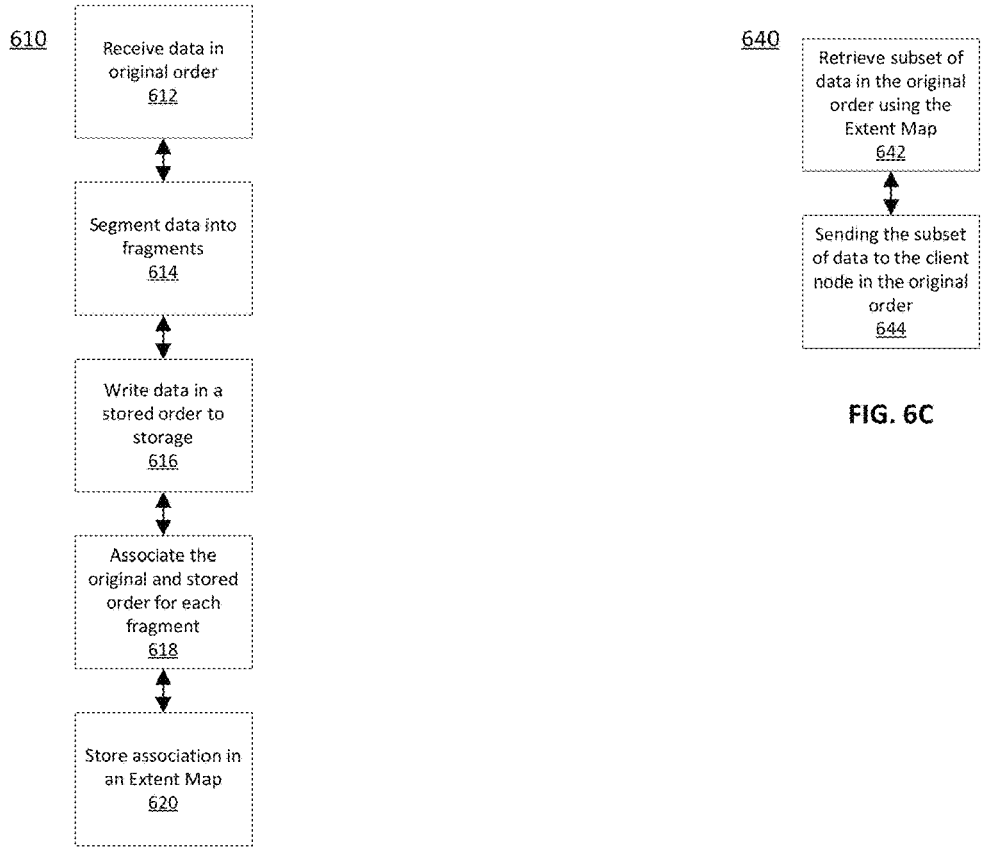
FIG. 6B
FIG. 6C

SYSTEM AND METHOD HAVING ACCELERATED DATA RECOVERY

BACKGROUND

The process of backing up data for most information technology systems comprises copying and archiving of computer data, such that it may be used to restore the original after a data loss event, including data deletion or corruption. In a computer cluster environment, having a server and multiple client nodes, data recovery may not always yield a high performance solution. In particular, a clustered environment enables a large number of parallel backups to exist due to enhanced bandwidth of the system. However, due to the random nature of storage within a clustered environment, only a small number of data recovery streams can occur simultaneously. In particular, when a first backup is performed, the server writes the backup data sequentially on one or more disks in storage. A single client that restores data from this backup image may achieve high throughput due to the sequential read performance associated with one or more disks. As incremental backups are taken from the same machine and data is deduplicated on the backup server, however, the backup image gets fragmented over a large number of sectors of the one or more disks. The restore performance from such a fragmented backup image suffers in performance, due to the random Input/Output (I/O) read performance problems exhibited by disks in comparison to sequential I/O read performance. For example, while an exemplary clustered environment may be able to perform 512 backups in parallel, this same system is only able to perform four data recovery (restoration) attempts in parallel due to the random I/O read performance.

Data recovery becomes even more complex when backups from multiple (differing) clients are performed simultaneously to the same backup server. When multiple clients send data at the same time, it leads to more segmentation of the stored data. In particular, the server may receive data from one client and write it to a disk. When the server receives data from another client, this data may be written to the same disk. Thereby, the data from one or more of the clients gets "scattered" on the disks. Further, when multiple clients request data, the backup server trashes (i.e. the disk head becomes overwhelmed with moving around in search of the most recent incremental backup of the data without reading or writing data). Therein, the data recovery throughput goes from bad to worse when multiple restores initiated by differing clients occur simultaneously. It is within this context that the embodiments arise.

SUMMARY

Embodiments of a system and method having accelerated data recovery in a clustered storage system is provided. It should be appreciated that the present embodiment can be implemented in numerous ways, such as a process, an apparatus, a system, a device, or a method. Several inventive embodiments are described below.

In some embodiments, a system and method having accelerated data recovery in a clustered storage system is provided. The method may include generating an extent map of data having an original order, wherein the extent map associates the original order with a stored order of the data in a plurality of storage units coupled to a server node. Further, the method may include receiving, in a request vector, a request for data recovery of a subset of the data and optimizing data retrieval of the subset of the data to a minimum recovery time using the extent map. For static optimization, the server node can generate a second map indicating the stored order of each fragment of data to be sent prior to the data. Alternatively in dynamic optimization, the server node can send a qualifying identifier with each fragment indicating the storage location. Further, the client node may take advantage of the write-back caching function to cache and rearrange the data before it stores the data. Thereby, the client node is enabled to rearrange the data upon receipt to its original order, minimizing random I/O reads by reading the data in the most contiguous way from the server.

In some embodiments, a storage controller having accelerated data recovery is provided. The storage controller may comprise a memory and a processor operator to generate an extent map of data having an original order, wherein the extent map associates the original order with a stored order of the data in a plurality of storage units coupled to a server node. The processor may be further operable to receive, in a request vector, a request for data recovery of a subset of the data from a client node and to optimize data retrieval of the subset of the data to a minimum recovery time using the extent map. For static optimization, the processor may be further operable to generate a second map indicating the stored order of each fragment of data to be sent to the requesting client node prior to the data. Alternatively in dynamic optimization, the processor may be further operable to send a qualifying identifier with each fragment indicating the storage location to the requesting client node. Further, the requesting client node coupled to the storage controller may take advantage of the write-back caching function to cache and rearrange the data before it stores the data using the extent map. Thereby, the client node is enabled to rearrange the data upon receipt to its original order, minimizing random Input/Output (I/O) reads by reading the data in the most contiguous way from the server.

In some embodiments, a tangible, non-transitory, computer-readable media having instructions whereupon which, when executed by a processor, cause the processor to perform the accelerated data recovery method described herein. The method may include generating an extent map of data having an original order, wherein the extent map associates the original order with a stored order of the data in a plurality of storage units coupled to a server node. Further, the method may include receiving, in a request vector, a request for data recovery of a subset of the data from the requesting client node and optimizing data retrieval of the subset of the data to a minimum recovery time using the extent map. For static optimization, the processor within a server node can generate a second map indicating the stored order of each fragment of data to be sent prior to the data. Alternatively in dynamic optimization, the the processor can send a qualifying identifier with each fragment indicating the storage location. Further, a processor within a client node having the accelerated data recovery method may take advantage of the write-back caching function to cache and rearrange the data before the client node stores the data. Thereby, the processor within the client node is enabled to rearrange the data upon receipt to its original order, minimizing random Input/Output (I/O) reads by reading the data in the most contiguous way from the server.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

FIG. 6A is a flow diagram of a method for accelerating data recovery using the extent map in accordance with some embodiments.

FIG. 6B is a flow diagram of a process for generating the extent map of FIG. 6A in accordance with some embodiments.

FIG. 6C is a flow diagram of a process for optimizing data recovery using the extent map of FIG. 6A at the server node in accordance with some embodiments.

DETAILED DESCRIPTION

Figure 1:
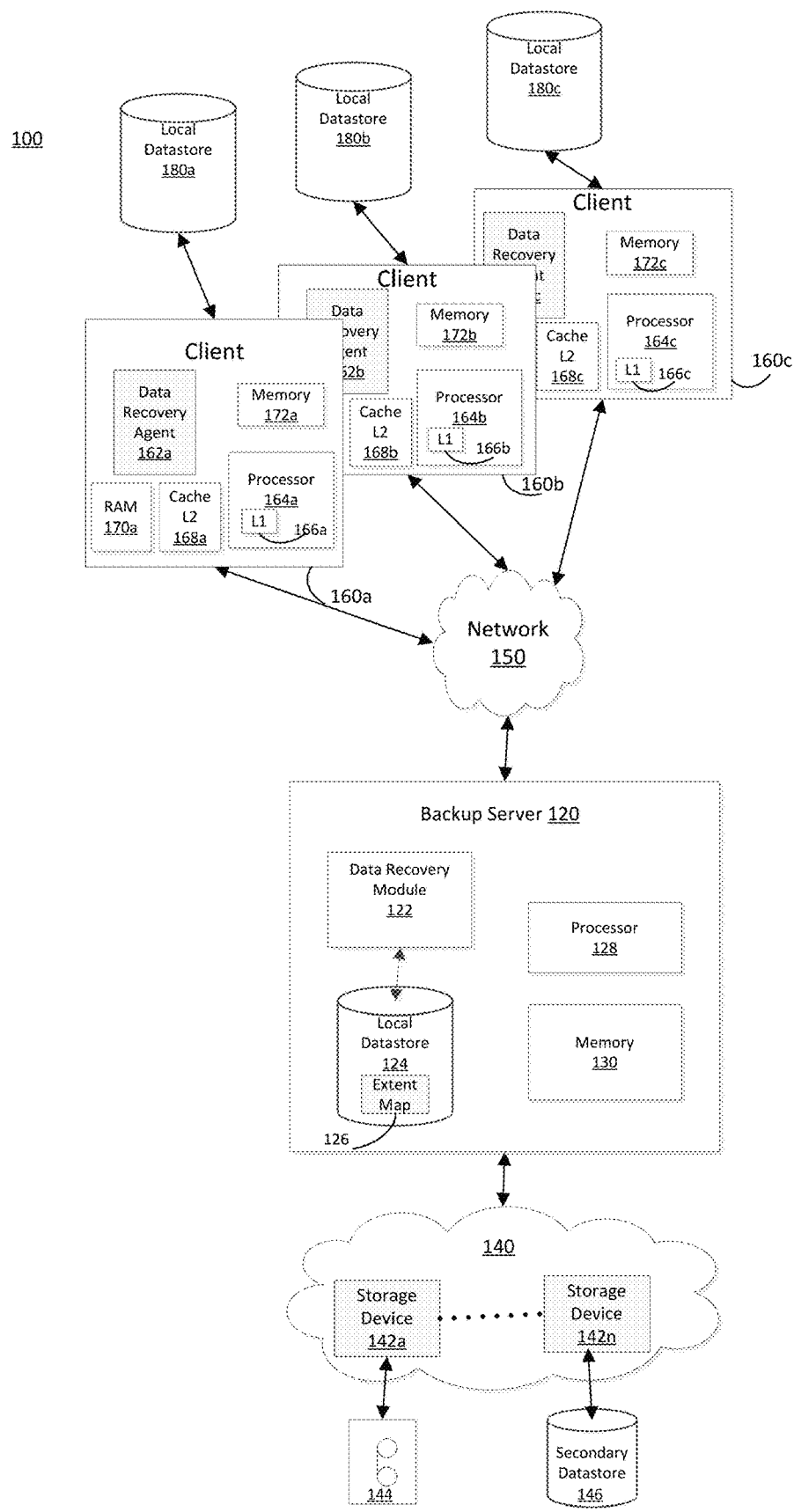
FIG. 1 is a perspective view of a storage cluster including one or more client nodes coupled to a backup server having an accelerated data recovery module, in accordance with some embodiments.

The following embodiments describe system and method having accelerated data recovery in a clustered storage system. It can be appreciated by one skilled in the art, that the embodiments may be practiced without some or all of these specific details. In other instances, well known process operations have not been described in detail in order not to unnecessarily obscure the embodiments.

In the system having accelerated data recovery in a clustered storage system, the method may include generating an extent map of data having an original order, wherein the extent map associates the original order with a stored order of the data in a plurality of storage units coupled to a server node. Further, the method may include receiving, in a request vector, a request for data recovery of a subset of the data and optimizing data retrieval of the subset of the data to a minimum recovery time using the extent map. For static optimization, the server node can generate a second map indicating the stored order of each fragment of data to be sent prior to the data. Alternatively in dynamic optimization, the server node can send a qualifying identifier with each fragment indicating the storage location. Further, the client node may take advantage of the write-back caching function to cache and rearrange the data before it stores the data. Thereby, the client node is enabled to rearrange the data upon receipt to its original order, minimizing random I/O reads by reading the data in the most contiguous way from the server.

Advantageously, backup systems using the method described herein may perform at a much higher level for restores and tape-outs. In particular, accelerated backup code may run on the client nodes, helping the backup server perform better. Further, the accelerated backup code can run on Enterprise® application servers that are geared for high I/O performance. Moreover, on the client-side, writes can be staged through write-back caching mechanisms to increase the total system performance and effectively allow large number of parallel restore operations from our backup appliances.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1, an exemplary embodiment of a storage cluster 100 including one or more client nodes 160a-c coupled to a backup server 120 having an accelerated data recovery module 122 is shown. Client nodes 160a-c, with local data store 180a-c, are coupled by a network 150 to a backup server 120 having remote storage device 142a-n. Each client node 160a-c includes a data recovery agent 162, memory 172, and a processor 164, having a level 1 (L1) cache 166. Each client node 160a-c may further include another temporary storage device such as a level 2 (L2) cache 168 (external to the processor 164) and a Random Access Memory (RAM) 170. Examples of the client nodes 160a-c may include, but are not limited to, personal computers, laptops, PDAs, mobile phones, network appliances, and the like. The data recovery agent 162 may serve as a device that communicates with the backup server 120 to perform the method of accelerated data recovery described more in detail below. The client nodes 160a-c, backup server 120, and the storage devices 142a-n may reside on the same LAN, or on different LANs that may be coupled together through the Internet, but separated by firewalls, routers, and/or other network devices. In one embodiment, client nodes 160a-c may couple to network 150 through a mobile communication network. In another embodiment, the client nodes 160a-c, backup server 120, and the storage devices 142a-n may reside on different networks. Although not shown, in various embodiments, the client node 160a-c may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like.

Although not shown, the system may include remote data storage units and tape-out devices coupled by a network to client nodes 160a-c. As such, data recovery requests may be restored to local data store 180, remote disks, or tape-outs devices. Further, in some embodiments, data recovery may be initially performed sequentially from the datastore 180a-c, and then to a remote site. In other embodiments, data recovery may be restored to tapes after data recovery occurs for the remote sites.

The backup server 120 may comprise a processor 128, memory 130, and data recovery module 122. The data recovery module 122 may comprise processing software instructions and/or hardware logic required for accelerated data retrieval according to the embodiments described herein. The backup server 128 may provide remote storage capabilities through the storage devices 142a-n coupled by network 140. Further, these may couple to one or more tape-out devices 144 or any other secondary datastore 146. The backup server 120 may also comprise a local data storage unit 124, which can be one or more centralized data repositories that store an extent map 126 having respective associations between each fragment of the backup data and its location within remote storage devices 142a-n. The local data store 124 may represent a single or multiple data structures (databases, repositories, files, etc.) residing on one or more mass storage devices, such as magnetic or optical storage based disks, tapes or hard drives. Although the data store 124 is illustrated as being an internal component of the backup server 120, data store 124 may couple externally to backup server 120, or remotely through a network. The backup server 120 can communicate with the remote storage devices 142a-n over a public or private network. Although not shown, in various embodiments, the backup server 120 may be a NetBackUp (NBU) Appliance (5330 Appliance), a notebook computer, desktop computer, microprocessor-based or programmable consumer electronics, network appliance, mobile telephone, smart telephone, radio frequency (RF) device, infrared (IR) device, Personal Digital Assistant (PDA), set-top box, an integrated device combining at least two of the preceding devices, and the like.

In operation, the backup server 120 may perform a sequential I/O read of the data by scanning through the client I/O request vector and rearranging other requests from differing clients by accounting for the in-progress I/O reads. In general, the expectation during data recovery is that when a client node 160 sends a request vector to the backup server 120 (asking for a restore of a particular file), the backup server 120 will sent the file in fragments, having an offset of 0 to 100 G. Due to the scattered nature of these fragments, the client node 160 more than likely will not receive the file from the server 120 in sequence. Rather, the backup server 120 will send the requested data to the client node 160 in the order that the server 120 deems necessary for optimum performance across multiple clients. To accommodate for this fact, in some embodiments, the backup server 120 may use either a static or a dynamic data recovery acceleration process. The backup server 120 may include logic that determines which data recovery process to use. In the alternative, a system administrator of the backup server 120 can set the data recovery to either the static or dynamic data recovery process.

In the static data recovery acceleration process, the backup server 120 may associate each data chunk sent by the client with its stored location in the remote storage devices 142a-n and, thereby, generate the extent map 126 containing these associations. Thereby, the extent map represents where on the disk the file is scattered. The extent map may reside on the backup server 120, where it is continually updated on the server with, not only new backups, but also changes and deletes of old backups. A copy of the extent map 126 may also be sent from the backup server 120 to the client node 160 prior to the sending of the requested data. Accordingly, on the server side, the backup server 120 may check the extent map to detect the location from which the requested data needs to be fetched. The server 120 may initially detect the nearest fragment that it can read, so that it can minimize the "disk seek" (where each disk represents a "seek agent"). In some embodiments, the goal of the accelerated process on the backup server 120 is to quickly reach the next fragment and send it to the client node 160 along with notice of the location of the data. Notice of the location, as noted above, may come in the form of a copy of the entire extent map. In the alternative, the server 120 may provide notice of the storage location associated with each data chunk by generating and sending a second map solely relating the location of the requested data. For example, in one embodiment, if a client node 160 requests data recovery of 100 million files, the server 120 can use the extent map to fetch the requested data with optimum performance After data retrieval, the backup server 120 may send the requested data to the client node 160 in random order after sending a copy of the entire extent map or a map associated with the requested data. The client node 160 may use either map to write the data in the original order on the local datastore, remote site, or tape-out device.

In another embodiment, the backup server 120 may use the extent map 126 to locally rearrange each data chunk in the original format prior to sending data associated with a backup recovery request to the respective client node 160a-c. As such, the client node 160 will receive the requested data in sequential order. In the alternative, as noted above, the backup server 120 may send the extent map 126 to the data recovery agent 162 within a respective one of the client nodes 160a-c; wherein, the data recovery agent 162 rearranges the data into the original format and stores these in the local datastore 180. Thereby, the client node is enabled to rearrange the data upon receipt to its original order, minimizing random I/O reads by reading the data in the most contiguous way from the server.

Using the dynamic data recovery acceleration process, the backup server 120 may qualify each data chunk sent to the client with (offset, length) and send the data out-of-order (randomly) to the client nodes 160a-c. That is, after scanning the extent map 126, the backup server 120 may generate qualifying identifiers of each data chunk and send these identifiers along with the requested data in a random order to the respective client node 160. Each client node 160a-c may in-turn allocate space for the full data set, which it expects to receive from the backup server 120, while writing the data in a random order as the data arrives from the backup server 120. The client nodes 160a-c may also take advantage of write-back caching in an effort to reduce randomness on the client-side; wherein, through the use of write-back caching modifications to the data can be stored in the cache L1 or L2 (166a-c, 168a-c) and not copied to the cache source (local datastore 180a-c) until absolutely necessary. Write-back caching, also known as copy-back caching, is available on many microprocessors, including all Intel processors since the 80486 processor model. Thereby with the use of any of these microprocessors, data modifications (e.g., write operations) to data stored in the L1 cache 166 do not have to be copied to main memory until absolutely necessary. With this performance improvement, however a slight risk may exist where data may be lost if the system crashes. Although the dynamic data recovery acceleration process increases bandwidth of the system over and above the static implementation, the dynamic implementation gives the system a lot more flexibility.

Figure 2A:
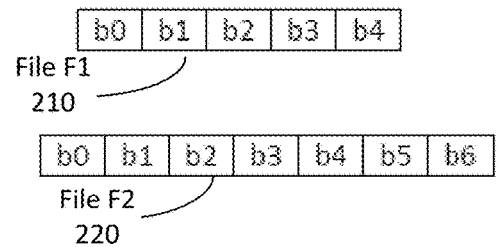
FIG. 2A is an example of a block diagram for two files stored in an original order stored upon a client node of the storage cluster in FIG. 1 in some embodiments.
Figure 2B:
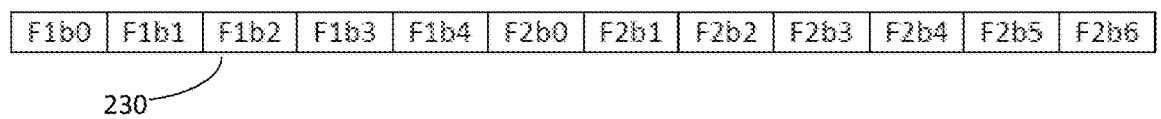
FIG. 2B is an example of a block diagram of the backup image of the two files of FIG. 2A sent by the client node to a server node in some embodiments.
Figure 3:
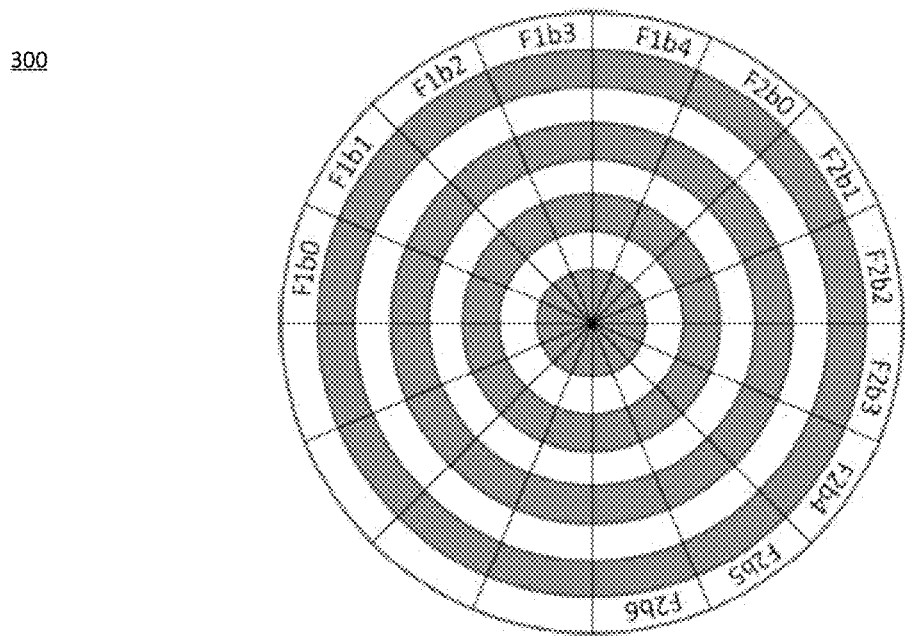
FIG. 3 is an example of the backup image of the two files of FIG. 2B written sequentially across a single disk for a single client backup in some embodiments.

By way of an example, FIG. 2A illustrates a block diagram for two files stored in an original order upon one of the client nodes 160a-c of the storage cluster in FIG. 1 in some embodiments. As shown, a first file F1 and a second file F2 (backup data 210 and 220) may be segmented into fragments. In particular, file F1 may include a set of data blocks: b0, b1, b2, b3, and b4; while, file F2 may include a set of data blocks: b0, b1, b2, b3, b4, b5, and b6. In this given scenario, a single client 160a may send data to the backup server 120, where the backup server 120 writes only one backup image to disk. FIG. 2B shows the associated block diagram of the backup image for the two files stored in FIG. 2A sent by a client node to a server node in some embodiments. When the backup server 120 is writing this image to a single disk within remote storage devices 142a-n, the entire image shown in FIG. 2B will be sequentially written to disk. Accordingly, FIG. 3 shows this example of the backup image of the two files stored of FIG. 2B written sequentially across a disk 300 for a single client backup in some embodiments. When this image is restored by the client node 160a-c, it gets very high throughput, because data is read sequentially from the disk 300. Characteristic of a single disk/single client data recovery is the absence of diskhead seek overheads, where penalize the read I/O operation.

Figure 4:
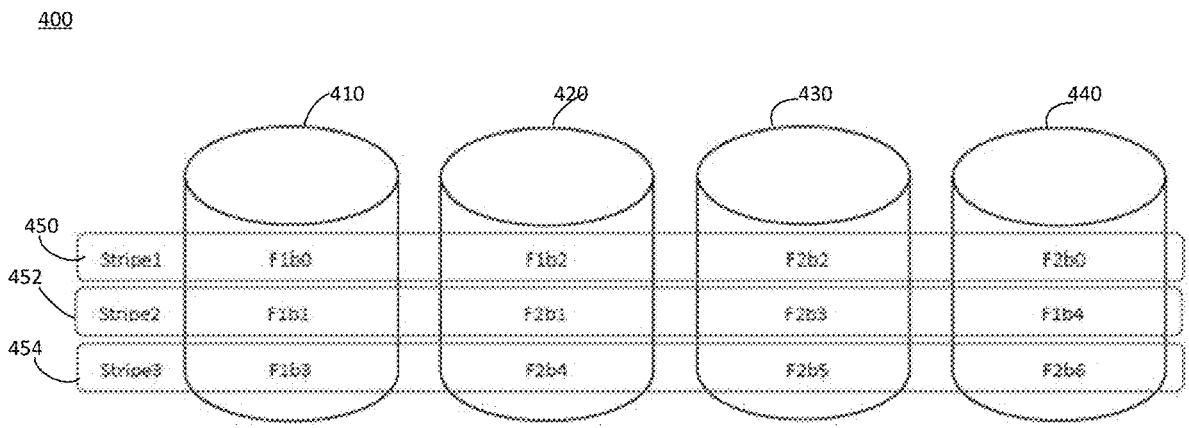
FIG. 4 is an example of the backup image of the two files of FIG. 2B stripped across multiple disks for multiple client nodes in some embodiments.

However, when the data is stored across multiple disks, the data tends to get scattered. FIG. 4 illustrates an example of the backup image of the two files stored of FIG. 2B stripped across multiple disks for multiple client nodes in some embodiments. In this example, two of the clients nodes (160a, 160b) are backed up in parallel, wherein the backup images for files F1 and F2 are stripped across multiple disks (410, 420, 430, 440) (i.e. both files are sent to backup server 120 by two clients in parallel). In this case, the data gets randomly striped across disks (410, 420, 430, 440) as shown in FIG. 4. In present backup data storage systems, when either of the two the clients nodes (160a, 160b) request data recovery, where an image associated with a file is restored, the read throughput of the backup storage system 100 decreases due to the backup server 120 having to perform a large amount of random reads, which cause lot of disk seeks across disks (410, 420, 430, 440). Further, the read throughput decreases further when multiple clients 160a-c read data recovery images in parallel. This problem applies to a data backup system having deduplication as well. When initial full backups are processed, the backup server 120 can maintain data locality by putting data from the same client stream and same policy type in a single container. However, when duplicate data is found between different client streams, the client streams start referring to data in data containers in random fashion. As a result, this action drives the read throughput down.

Figure 5:
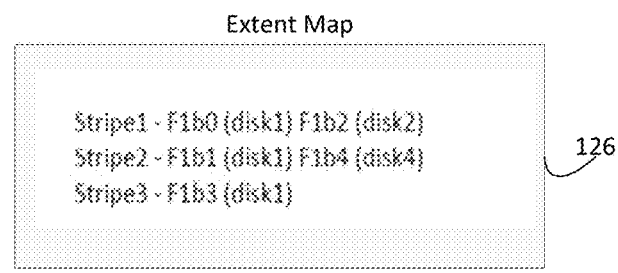
FIG. 5 is an example of the extent map of the two files stored in a stripped fashion across multiple disks for multiple client nodes of FIG. 4 in some embodiments.

The data storage system and method having an accelerated data recovery described herein provides an advantage over the current systems. In particular, FIG. 5 shows an example of the extent map 126 of a requested file (F1) stored stripped across multiple disks for multiple client nodes backup of FIG. 4; wherein, the extent map 126 is generated by the data recovery module 122 of the backup server 120 in some embodiments. As noted supra, in the static data recovery acceleration process, the backup server 120 may associate each data chunk sent to by the client node 160 with its stored location in the remote storage devices 142a-n, generating an extent map 126 containing these associations. In one embodiment, the backup server 120 may use the extent map 126 to locally rearrange each data chunk in the original format prior to sending data associated with a backup recovery request. In the alternative, the backup server 120 may send the extent map 126 to the data recovery agent 162 within a respective one of the client nodes 160a-c; wherein, the data recovery agent 162 rearranges the data into the original format and stores these in the local datastore 180. In another embodiment the backup server 120 may generate a mapping that only refers to the subset of data requested in a request vector for the data recovery as shown in FIG. 5. For example, the backup server 120 may generate a map that refers to the associated locations of the data chunks of file F1. The backup server 120 may send this second mapping to the data recovery agent 162 for rearranging each data chunk that is sent to the client node 160 in random order. Thereby, the client node 160 receives the extent map or the second mapping from the backup server 120 before initiating the restore I/O reads.

Considering the example given above, the client node 160 restoring the backup image associated with file F1 receives the extent map as shown in FIG. 5 from the server 120. The client node 160 identifies in which stripe region the data resides. As shown, the first stripe, Stripe1, includes metadata F1b0 in disk 1 and metadata F1b2 in disk2. The second stripe, Stripe2, includes metadata F1b1 in disk 1 and metadata F1b4 in disk4. The third stripe, Stripe3, includes metadata F1b3 in disk 1. The client node 160 first reads F1 metadata from the catalog of the backup server 120. Based upon the file size found in the metadata, the client node 160 pre-allocates the file F1 on a client disk in the local data store 180 and then starts reading the extent map from the backup server 120. In the noted example above, the client node 160 may first read block b0 and b2 from the first stripe Stripe1. Afterwards, the client node 160 may write these images at respective offsets in pre-allocated file space for file F1. Following, the client node 160 may write the images for fragments b1, b4, and b3, consecutively in the pre-allocated file space for file F1. Essentially in this example, the client node 160 has turned all random I/O reads to sequential reads on the server side, which improves overall read throughput.

As a further advantage, when multiple client nodes 160a-c or multiple streams are reading in parallel, the backup server is enabled to further reduce the read throughput. In particular, each of the client nodes 160a-c may simultaneously send read requests to backup server 120 to read the extent stripes. For example, the client nodes 160a and 160b may send requests "F1b0 (disk1) F1b2 (disk2)" or "F2b2 (disk1) F2b0 (disk2)." When both of these requests come to backup server 120 at the same time, the server 120 may combine the I/O reads in an effort to read the entire stripe which further improves throughput. In particular, after receiving a data recovery request, the backup server 120 may search the extent map to determine a position from which to read the data. In this example, the server 120 detects from the extent map that the diskhead must read 10 sectors from sector 5; and then jump to sector 50 to read another 10 sectors for the data recovery attempt from the first client node 160a. Continuing with this example, while the backup server 120 is reading the first 10 sectors, another request from a second client node 160b is sent that requests data from sector 15 for 10 sectors. At this point, the data recovery module 122 of backup server 120 uses the extent map to determine what is the optimum path for data recovery. In particular, the data recovery module 122 may determine that since the first read encompasses sector 15, the diskhead should not just jump to sector 50 to complete the data recovery of the first client node 160a. Rather, the data recovery module 122 detects that it would be best to continue to send sectors 15-25 to the second client 160b. As such, the first client node 160a will be sent sectors 5-15 and the second client node 160b will be sent sectors 15-25 prior to sending the data associated with sector 50. In some embodiments, each extent map associated with each data recovery gets merged as more I/O requests are received; wherein, the backup server 120 can use these to determine the most optimum way to send the data to the client node 160. The data recovery module 122 of the backup server 120 may include merging logic to address these multiple client and multiple stream requests.

As noted supra, during the dynamic data recovery acceleration process, the backup server 120 may qualify each data chunk sent to the client node 160 with an offset and data length; and send the data out-of-order (randomly) to the client node 160. Each client nodes 160a-c may in-turn allocate space for the full data set, which it expects from the backup server 120, and write the data in a random order as the data arrives from the backup server 120. In this embodiment, the client nodes 160a-c may receive self-describing data (i.e. file, offset, data, and the like) from the server 120 during restores. Considering the example given above, the client node 160 restoring the backup image associated with file F1 receives a qualifier for each data chunk that specifies the offset of where the data should be arranged with respect to the original order and the length of the data. Thereby, the client node is able to write the randomly sent data chunks in the original order in a data store, such as one of the local datastore 180a-c. Thereby, organization of the data chunks occurs on the client side without encumbering the resources of the server 120.

FIG. 6A is an exemplary flow diagram of a method for accelerating data recovery using the extent map in accordance with some embodiments. In an action 610, an extent map of data having an original order may be generated; wherein, the extent map associates the original order with a stored order of the data in a plurality of storage units coupled to a server node. For example, the process shown in FIG. 6B may implemented to generate the extent map. In particular, FIG. 6B is a flow diagram of a process for generating the extent map of FIG. 6A in accordance with some embodiments. In action 612, the data recovery module may receive the data having the original order at a server node coupled to the plurality of storage units. Further, the data recovery module may segment the data into a plurality of fragments in an action 616. In an action 616, the data recovery module may write the data in a stored order to storage, such that each of the plurality of fragments resides on a corresponding one of the plurality of storage units. Each of the plurality of fragments may be associated with the stored order on the storage unit and stored in the extent map, in actions 618 and 620.

Figure 6D:
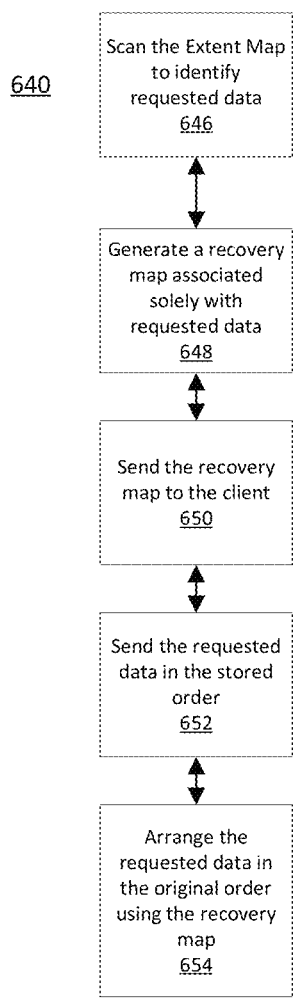
FIG. 6D is a flow diagram of a method for optimizing data recovery using the extent map of FIG. 6A at the client node in accordance with some embodiments.

Referring back to FIG. 6A, a request for data recovery of a subset of data, in a request vector, may be received in an action 630. At this point in a decision action 635, the backup server 120 detects whether the static or dynamic process for accelerated backup recovery is to be employed. This may be a preset variable stored on the backup server 120 or it may be manually initiated by a system administrator at the backup server 120. When the static process is implemented, the data retrieval of the requested data may be optimized to a minimum recovery time using the extent map in an action 640. There may be various methods to optimize data recovery including those shown in FIGS. 6C-6D. For example, FIG. 6C is a flow diagram of a process for optimizing data recovery using the extent map of FIG. 6A at the server node 120 in accordance with some embodiments. In particular, in action 642, the backup server 120 may retrieve the requested data in the original order using the extent map. Accordingly, the backup server 120 may send the requested data to the client node in the original order, in action 644.

In the alternative, FIG. 6D displays a flow diagram of a method for optimizing data recovery using the extent map of FIG. 6A at the client node in accordance with some embodiments. In action 646, the data recovery module may scan the extent map to identify requested data. The data recovery module may generate a second, recovery map, which comprises the mapping of the requested data and the location within storage, in action 648. The server, in action 650, may send this recovery map to the client node prior to sending the requested data in action 652. In the alternative, the recovery map may be sent simultaneously with the requested data. In action 654, the client node may arrange the requested data in the original order using the recovery map. Further, the client node may take advantage of the write-back caching function to cache and rearrange the data before it stores the data. Thereby, the client node is enabled to rearrange the data upon receipt to its original order, minimizing random Input/Output (I/O) reads by reading the data in the most contiguous way from the server.

Figure 6E:
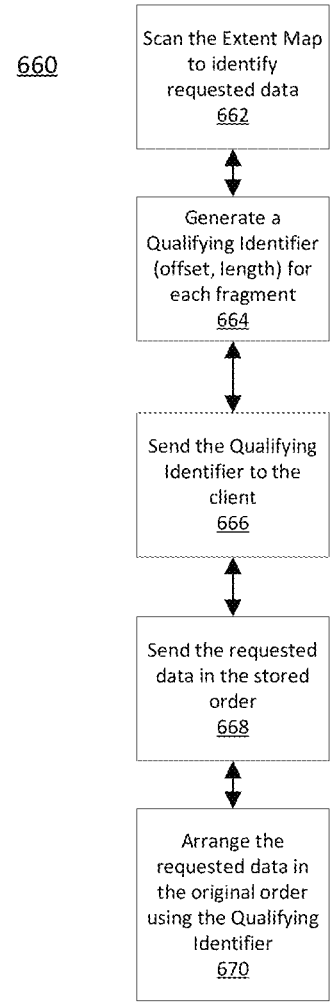
FIG. 6E is a flow diagram of a method for optimizing data recovery using the qualifying identifiers of FIG. 6A at the client node in accordance with some embodiments

Referring back to FIG. 6A, when the dynamic process is implemented, the backup server 120 may optimize data retrieval using qualifying identifier associated with each data chunk in an action 660. In particular, FIG. 6E is a flow diagram of a method for optimizing data recovery using the qualifying identifiers of FIG. 6A (660) at the client node in accordance with some embodiments. In an action 662, the data recovery module may scan the extent map to identify the requested data. The data recovery module may further generate qualifying identifiers associated with each fragment, including an offset and length of data fragment, in action 664. The server, in action 666, may send each qualifying identifier to the client node prior to sending a corresponding fragment of the requested data in action 668. In the alternative, the each qualifying identifier may be sent simultaneously with each corresponding fragment of the requested data. Finally, in an action 670, the client node may arrange the requested data in the original order using each qualifying identifier.

Figure 7:
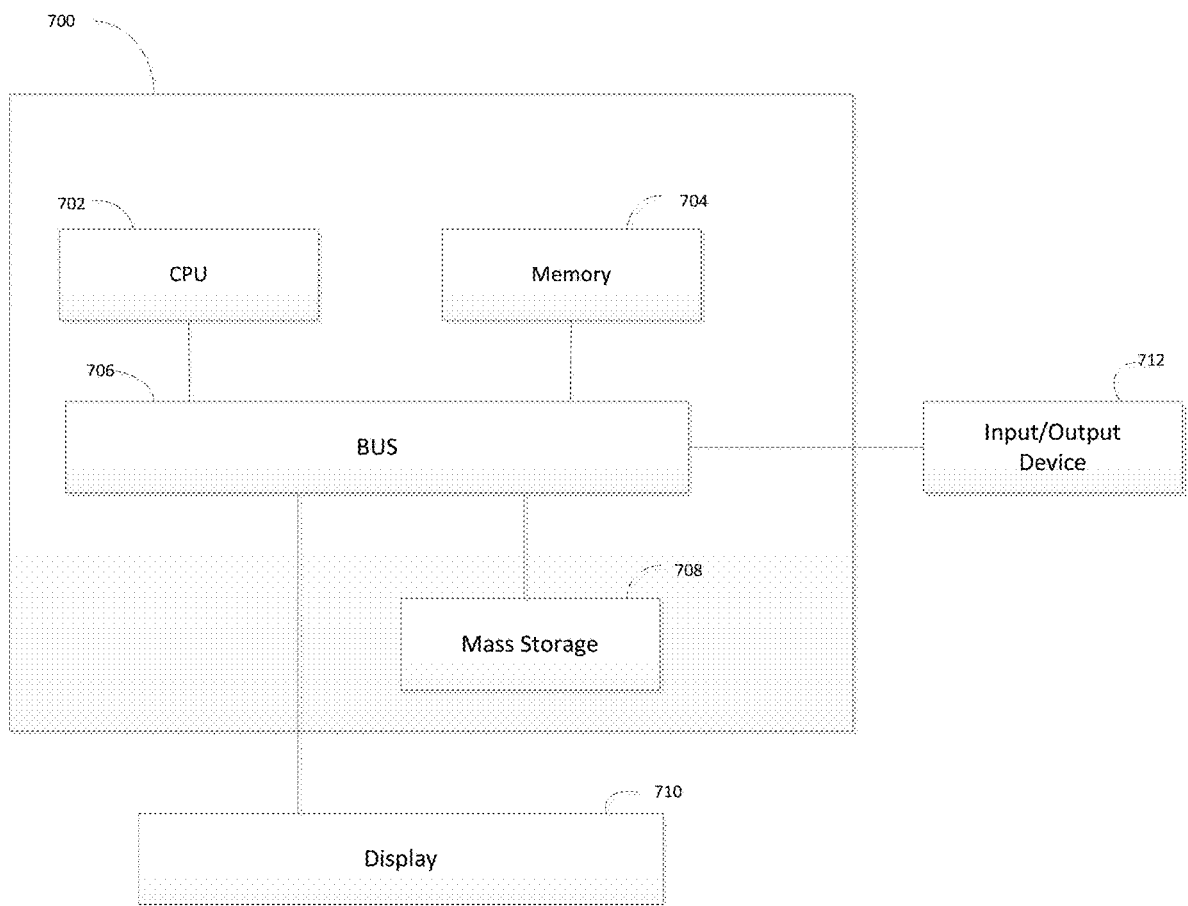
FIG. 7 is an illustration showing an exemplary computing device which may implement the embodiments described herein.

Although the actions are not shown in FIG. 6A, the method of data recovery using the accelerated process disclosed herein may also include a set of actions for processing multiple client requests and multiple streams. In particular, the method may include an action for merging the extent maps of multiple client requests and/or streams, such that each extent map associated with each data recovery gets merged as more I/O requests are received. Accordingly, the merged extent map can be used by the backup server 120 to determine the most optimum way to send the data to the client node 160. Thereby, the method may further include an action of optimizing the data retrieval using this merged extent map. The data recovery module 122 of the backup server 120 may include software or merging logic to address these multiple client and multiple stream requests It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device which may implement the embodiments of the client nodes 160a-c and/or the backup server 120 described herein. The computing device of FIG. 7 may be used to perform embodiments of the functionality for performing the data recovery of large datasets in accordance with some embodiments. The computing device includes a central processing unit (CPU) 702, which is coupled through a bus 706 to a memory 704, and mass storage device 708. Mass storage device 708 represents a persistent data storage device such as a floppy disc drive or a fixed disc drive, which may be local or remote in some embodiments. The mass storage device 708 could implement a backup storage, in some embodiments. Memory 704 may include read only memory, random access memory, etc. Applications resident on the computing device may be stored on or accessed through a computer readable medium such as memory 704 or mass storage device 708 in some embodiments. Applications may also be in the form of modulated electronic signals modulated accessed through a network modem or other network interface of the computing device. It should be appreciated that CPU 702 may be embodied in a general-purpose processor, a special purpose processor, or a specially programmed logic device in some embodiments.

Display 712 is in communication with CPU 702, memory 704, and mass storage device 708, through bus 706. Display 712 is configured to display any visualization tools or reports associated with the system described herein. Input/output device 710 is coupled to bus 706 in order to communicate information in command selections to CPU 702. It should be appreciated that data to and from external devices may be communicated through the input/output device 710. CPU 702 can be defined to execute the functionality described herein to enable the functionality described with reference to FIGS. 1 and 6A-6E. The code embodying this functionality may be stored within memory 704 or mass storage device 708 for execution by a processor such as CPU 702 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of storing data in a storage system in which a plurality of clients are backed up in parallel, comprising:
   receiving data associated with multiple client requests at a server node coupled to a plurality of storage units;
   segmenting the data into a plurality of fragments;

writing the data in the plurality of storage units in a stripped manner, such that each of the plurality of fragments resides on a corresponding one of the plurality of storage units;

associating each of the plurality of fragments with a stored order in the plurality of storage units to generate an extent map, wherein the extent map associates an original sequence order with the stored order of the data stored in the plurality of storage units coupled to the server node, the stored order differing from the original sequence order of the data and being an order in which the data is scattered across the plurality of storage units;

receiving, in a request vector, a request for data recovery of a subset of the data; wherein the requested subset of the data is stored out of order;

accelerating data retrieval of the subset of the data from the plurality of storage units to a minimum recovery time by selecting one of: 1) sending the subset of data and the extent map to a client; 2) sending to the client the subset of the data and information based on a scan of the extent map to identify storage locations of the subset of data; and 3) using the extent map to reorder the subset of data to the stored order prior to sending the reordered subset of data to the client.

2. The method of claim 1, wherein the reordering the subset of data comprises:

retrieving, by the server, the subset of data in the original sequence order using the extent map; and sending the subset of data to a client node in the original sequence order.

3. The method of claim 1, wherein the generating information corresponds to a recovery map, and the accelerating comprises:

scanning the extent map to identify the subset of the data;
generating a recovery map having each storage location associated with the identified subset of the data;
sending the recovery map to a client node;
sending the subset of data to the client node in the stored order; and
arranging, by the client node, the subset of data in the original sequence order based upon the recovery map.

4. The method of claim 1, wherein the information comprises at least one identifier and the accelerating comprises:

scanning the extent map to identify the subset of the data;
generating a qualifying identifier for each fragment of the subset of data associated with a location within the plurality of storage units;
sending each qualifying identifier to a client node;
sending the subset of data in the stored order to the client node; and
arranging, by the client node, the subset of data in the original sequence order based upon the each qualifying identifier.

5. The method of claim 1, wherein the reordering the subset of data comprises:

rearranging the subset of data to the original sequence order using the extent map; and sending the subset of data to a client node in the original sequence order.

6. The method of claim 1, wherein the accelerating comprises:

generating a recovery map having each storage location associated with the subset of the data using the extent map;
sending the recovery map to a client node;
sending the subset of data to the client node in the stored order; caching the subset of data; and rearranging the subset of data to the original sequence order using the recovery map.

7. A storage system to backup a plurality of clients in parallel comprising:

a memory; and
a processor operable to:
receive data associated with multiple client requests at a server node coupled to a plurality of storage units;
segmenting the data into a plurality of fragments;
write the data in the plurality of storage units in a stripped manner, such that each of the plurality of fragments resides on a corresponding one of the plurality of storage units;
associate each of the plurality of fragments with a stored order in the plurality of storage units to generate an extent map, wherein the extent map associates an original sequence order with the stored order of the data stored in the plurality of storage units coupled to the server node, the stored order differing from the original sequence order of the data and being an order in which the data is scattered across the plurality of storage units;
receive, in a request vector, a request for data recovery of a subset of the data wherein the requested subset of the data is stored out of order; and
accelerate data retrieval of the subset of the data from the plurality of storage units to a minimum recovery time by selecting one of: 1) sending the subset of data and the extent map to a client; 2) sending to the client the subset of the data and information based on a scan of the extent map to identify storage locations of the subset of data; and 3) using the extent map to reorder the subset of data to the stored order prior to sending the reordered subset of data to the client.

8. The storage system of claim 7, wherein the processor, for optimizing data retrieval, is operable to:

retrieve the subset of data in the original sequence order using the extent map; and
send the subset of data to a client node in the original sequence order.

9. The storage system of claim 7, wherein the processor, for optimizing data retrieval, is operable to:

scan the extent map to identify the subset of the data;
generate a recovery map having each storage location associated with the identified subset of the data;
send the recovery map to a client node;
send the subset of data to the client node in the stored order; and
arrange, by the client node, the subset of data in the original sequence order based upon the recovery map.

10. The storage system of claim 7, wherein the processor, for optimizing data retrieval, is operable to:

scan the extent map to identify the subset of the data;
generate a qualifying identifier for each fragment of the subset of data associated with a location within the plurality of storage units;
send each qualifying identifier to a client node;
send the subset of data in the stored order to the client node; and
arrange, by the client node, the subset of data in the original sequence order based upon the each qualifying identifier.

11. The storage system of claim 7, wherein the processor, for optimizing data retrieval, is operable to:

rearrange the subset of data to the original sequence order using the extent map; and send the subset of data to a client node in the original sequence order.

12. A non-transitory computer-readable medium including code for performing a method in which a plurality of clients are backed up in parallel, the method comprising:

receiving data associated with multiple client requests at a server node coupled to a plurality of storage units;

segmenting the data into a plurality of fragments;

writing the data in the plurality of storage units in a stripped manner, such that each of the plurality of fragments resides on a corresponding one of the plurality of storage units;

associating each of the plurality of fragments with a stored order in the plurality of storage units to generate an extent map, wherein the stored order differs from a sequence order of individual clients, wherein the extent map associates an original sequence order with the stored order of the data stored in the plurality of storage units coupled to the server node, the stored order differing from the original sequence order of the data and being an order in which the data is scattered across the plurality of storage units;

receiving, in a request vector, a request for data recovery of a subset of the data wherein the requested subset of the data is stored out of order; and accelerating data retrieval of the subset of the data from the plurality of storage units to a minimum recovery time by selecting one of: 1) sending the subset of data and the extent map to a client; 2) sending to the client the subset of the data and information based on a scan of the extent map to identify storage locations of the subset of data; and 3) using the extent map to reorder the subset of data to the stored order prior to sending the reordered subset of data to the client.

13. The computer-readable medium of claim 12, wherein the accelerating comprises:

retrieving the subset of data in the original sequence order using the extent map; and sending the subset of data to a client node in the original sequence order.

14. The computer-readable medium of claim 12, wherein the accelerating comprises:

scanning the extent map to identify the subset of the data;

generating a recovery map having each storage location associated with the identified subset of the data;

sending the recovery map to a client node;

sending the subset of data to the client node in the stored order; and arranging, by the client node, the subset of data in the original sequence order based upon the recovery map.

15. The computer-readable medium of claim 12, wherein the accelerating comprises:

scanning the extent map to identify the subset of the data;

generating a qualifying identifier for each fragment of the subset of data associated with a location within the plurality of storage units;

sending each qualifying identifier to a client node;

sending the subset of data in the stored order to the client node; and arranging, by the client node, the subset of data in the original sequence order based upon the each qualifying identifier.

16. The computer-readable medium of claim 12, wherein the accelerating comprises:

rearranging the subset of data to the original sequence order using the extent map; and sending the subset of data to a client node in the original sequence order.

17. The method of claim 1, wherein there are a plurality of client nodes and the data originates from plurality of clients.

* * * * *